(12) United States Patent
Choraku et al.

(10) Patent No.: US 9,715,062 B2
(45) Date of Patent: Jul. 25, 2017

(54) OPTICAL AXIS ADJUSTMENT METHOD FOR OPTICAL INTERCONNECTION, AND OPTICAL INTERCONNECTION SUBSTRATE

(71) Applicant: FUJITSU LIMITED, Kawasaki-shi, Kanagawa (JP)

(72) Inventors: Kohei Choraku, Yokohama (JP); Akiko Matsui, Meguro (JP); Tetsuro Yamada, Kawasaki (JP); Yoshiyuki Hiroshima, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 14/950,981

(22) Filed: Nov. 24, 2015

(65) Prior Publication Data

US 2016/0202413 A1 Jul. 14, 2016

(30) Foreign Application Priority Data

Jan. 8, 2015 (JP) .................................. 2015-002685

(51) Int. Cl.
*G02B 6/12* (2006.01)
*G02B 6/13* (2006.01)
*G02B 6/42* (2006.01)
*G02B 6/125* (2006.01)

(52) U.S. Cl.
CPC ..... *G02B 6/12002* (2013.01); *G02B 6/12004* (2013.01); *G02B 6/125* (2013.01); *G02B 6/13* (2013.01); *G02B 6/42* (2013.01); *G02B 6/428* (2013.01); *G02B 6/4214* (2013.01); *G02B 6/4224* (2013.01); *G02B 2006/121* (2013.01); *G02B 2006/12104* (2013.01); *G02B 2006/12121* (2013.01); *G02B 2006/12123* (2013.01); *G02B 2006/12147* (2013.01)

(58) Field of Classification Search
CPC .... G02B 6/13; G02B 6/4224; G02B 6/12004; G02B 2006/121; G02B 6/428; G02B 6/42; G02B 6/4214; G02B 6/125
USPC ............................................... 385/14; 29/593
See application file for complete search history.

(56) References Cited

U.S. PATENT DOCUMENTS

| 6,343,171 B1* | 1/2002 | Yoshimura | G02B 6/12002 257/E23.01 |
|---|---|---|---|
| 6,438,281 B1* | 8/2002 | Tsukamoto | G02B 6/138 385/14 |
| 6,611,635 B1* | 8/2003 | Yoshimura | G02B 6/12002 257/E23.01 |

(Continued)

FOREIGN PATENT DOCUMENTS

| JP | 2003-270462 | 9/2003 |
|---|---|---|
| JP | 2005-265885 | 9/2005 |

*Primary Examiner* — Akm Enayet Ullah
(74) *Attorney, Agent, or Firm* — Fujitsu Patent Center

(57) ABSTRACT

An optical axis adjustment method for optical interconnection, includes: providing, on a substrate, an optical transmitter including light sources and a mark for acquiring a position of each of the light sources; providing, on the substrate, an optical waveguide including cores each allowing light emitted from the respective light sources to propagate through the core; determining a first position based on the mark as a position of each of the light sources; and forming, at a second position in the optical waveguide corresponding to the first position, first mirrors configured to reflect the light emitted from the respective light sources and make the light propagate through the respective cores.

10 Claims, 20 Drawing Sheets

(56) References Cited

U.S. PATENT DOCUMENTS

| | | | | |
|---|---|---|---|---|
| 6,845,184 B1* | 1/2005 | Yoshimura | ......... | G02B 6/12002 |
| | | | | 257/E23.01 |
| 7,248,768 B2* | 7/2007 | Jeon | ......... | G02B 6/10 |
| | | | | 385/39 |
| 7,330,247 B2* | 2/2008 | Hasegawa | ......... | G02B 6/30 |
| | | | | 356/153 |
| 7,590,315 B2* | 9/2009 | Okubo | ......... | G02B 6/4239 |
| | | | | 385/14 |
| 2002/0118907 A1* | 8/2002 | Sugama | ......... | G02B 6/12002 |
| | | | | 385/14 |
| 2007/0077008 A1* | 4/2007 | Jeon | ......... | G02B 6/10 |
| | | | | 385/49 |
| 2007/0160337 A1* | 7/2007 | Kim | ......... | G02B 6/43 |
| | | | | 385/131 |
| 2009/0232443 A1* | 9/2009 | Oda | ......... | G02B 6/4214 |
| | | | | 385/14 |
| 2012/0219251 A1* | 8/2012 | Kuroda | ......... | G02B 6/122 |
| | | | | 385/14 |
| 2012/0318964 A1* | 12/2012 | Yamamoto | ......... | G02B 6/138 |
| | | | | 250/227.11 |

* cited by examiner

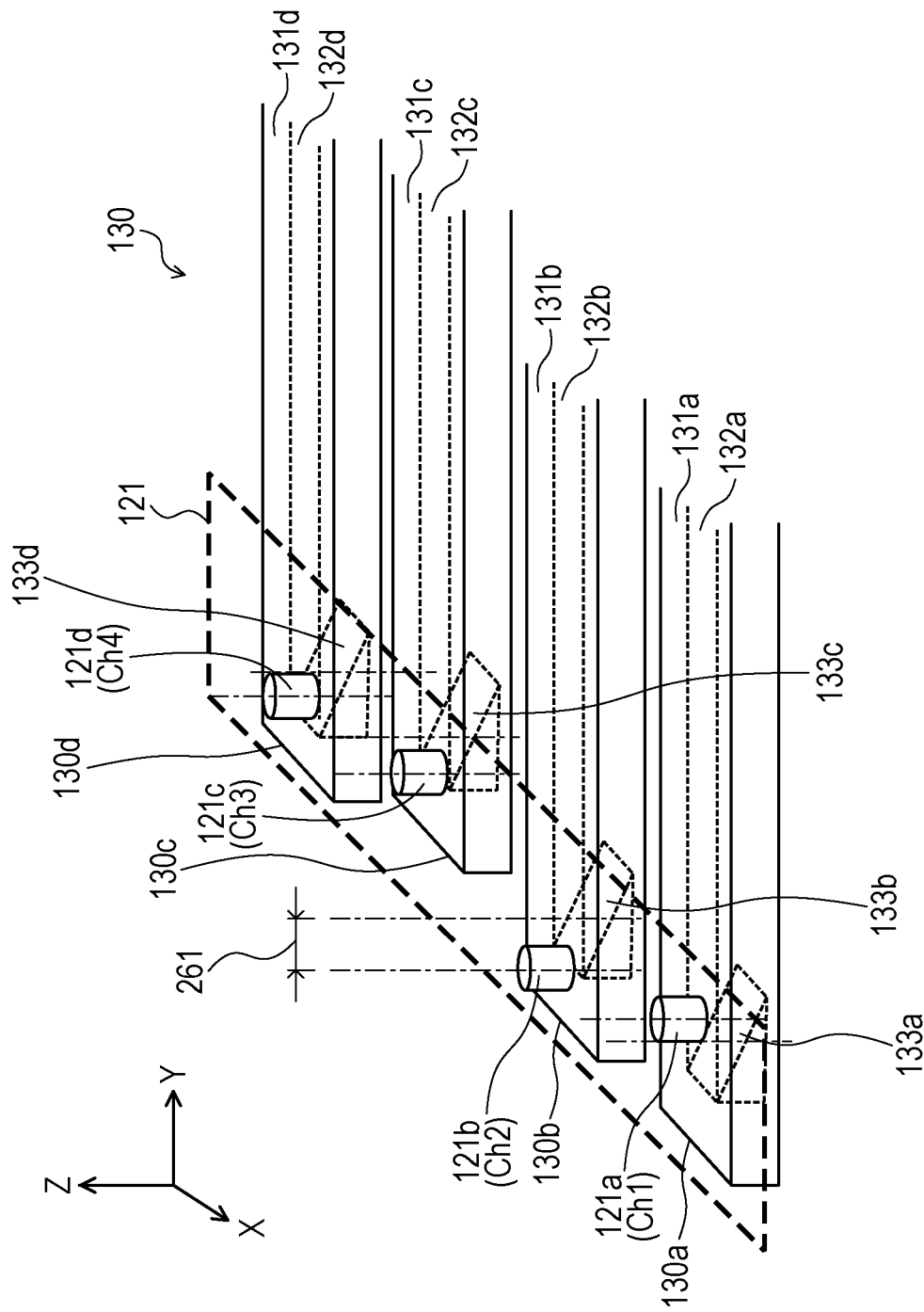

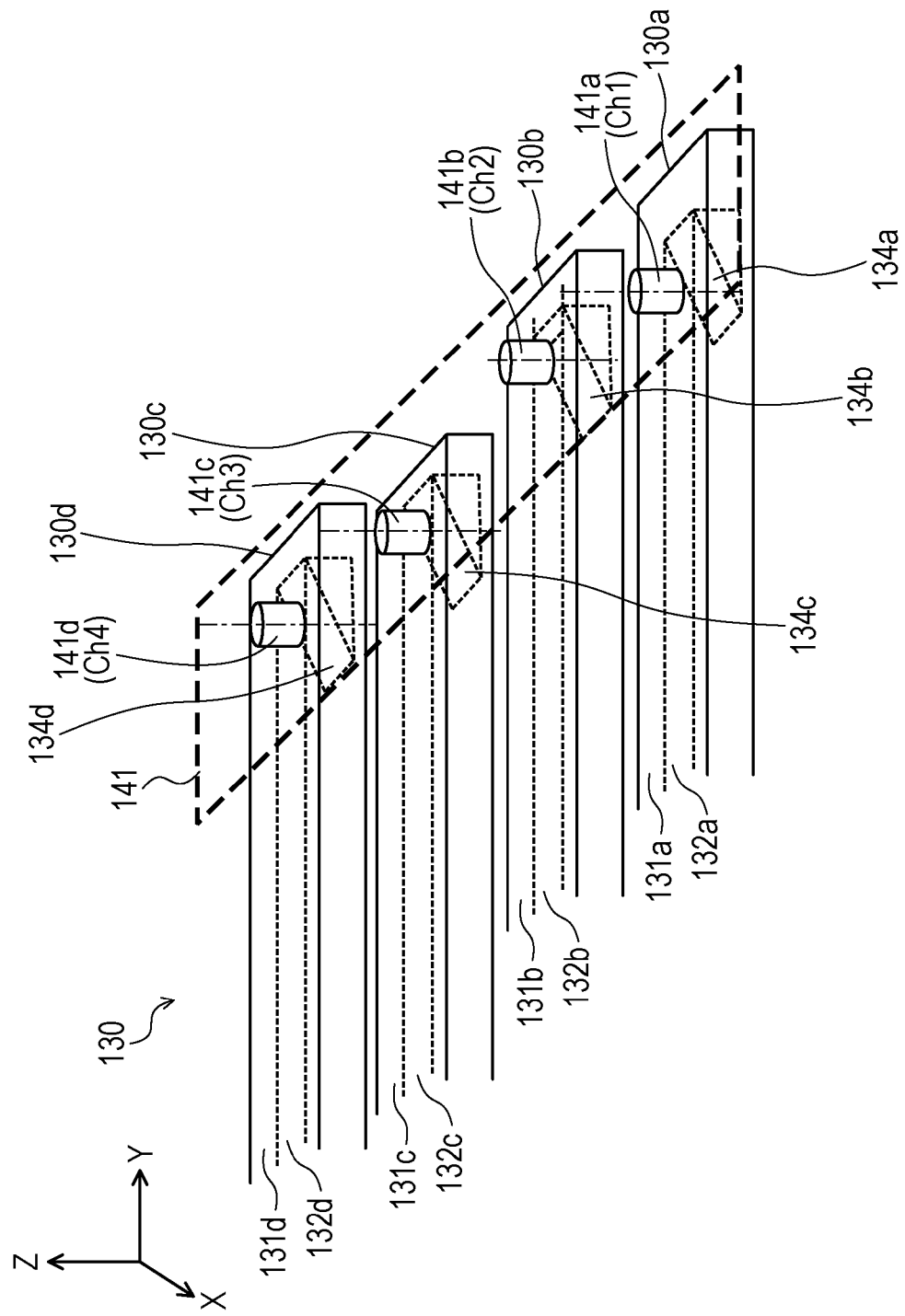

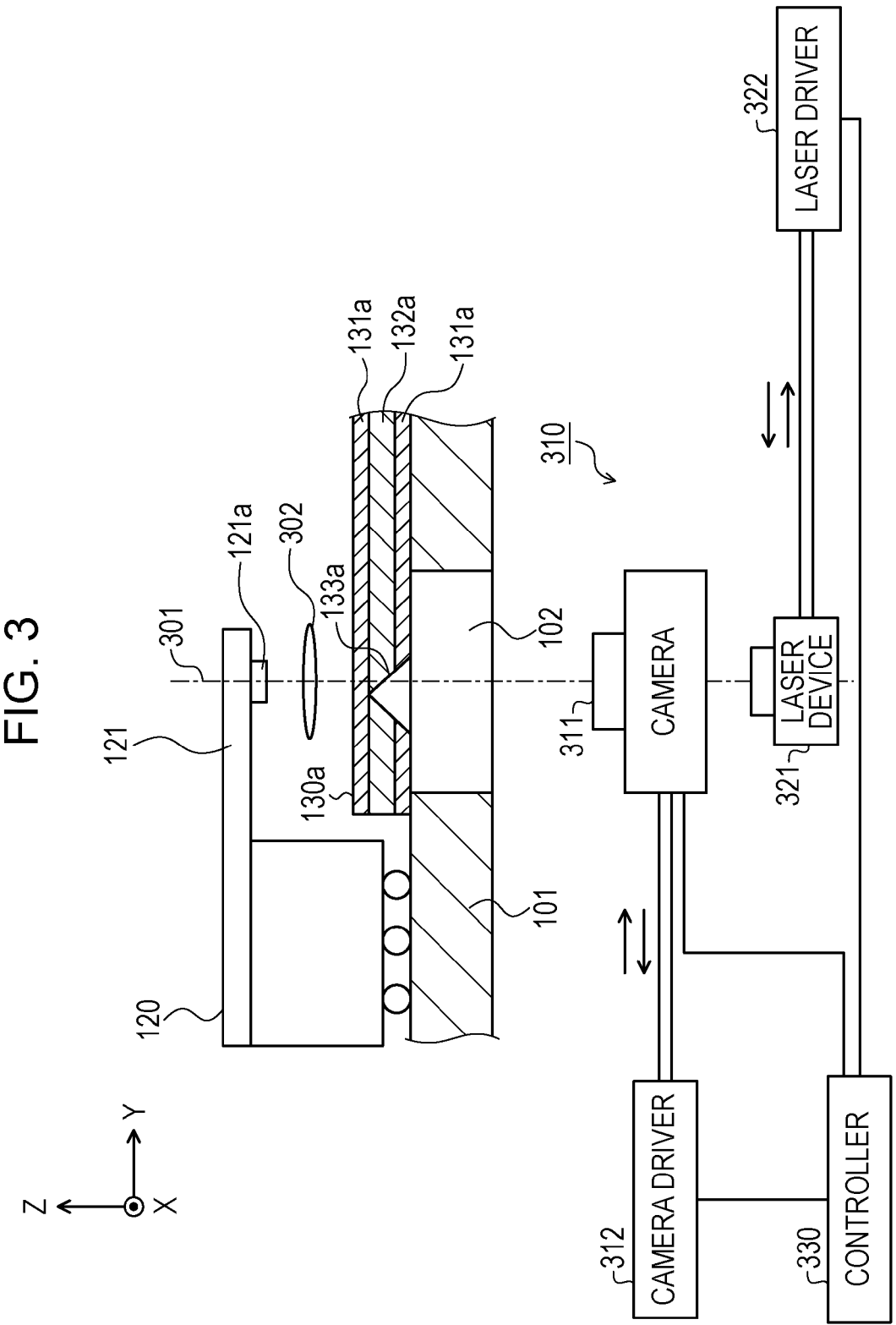

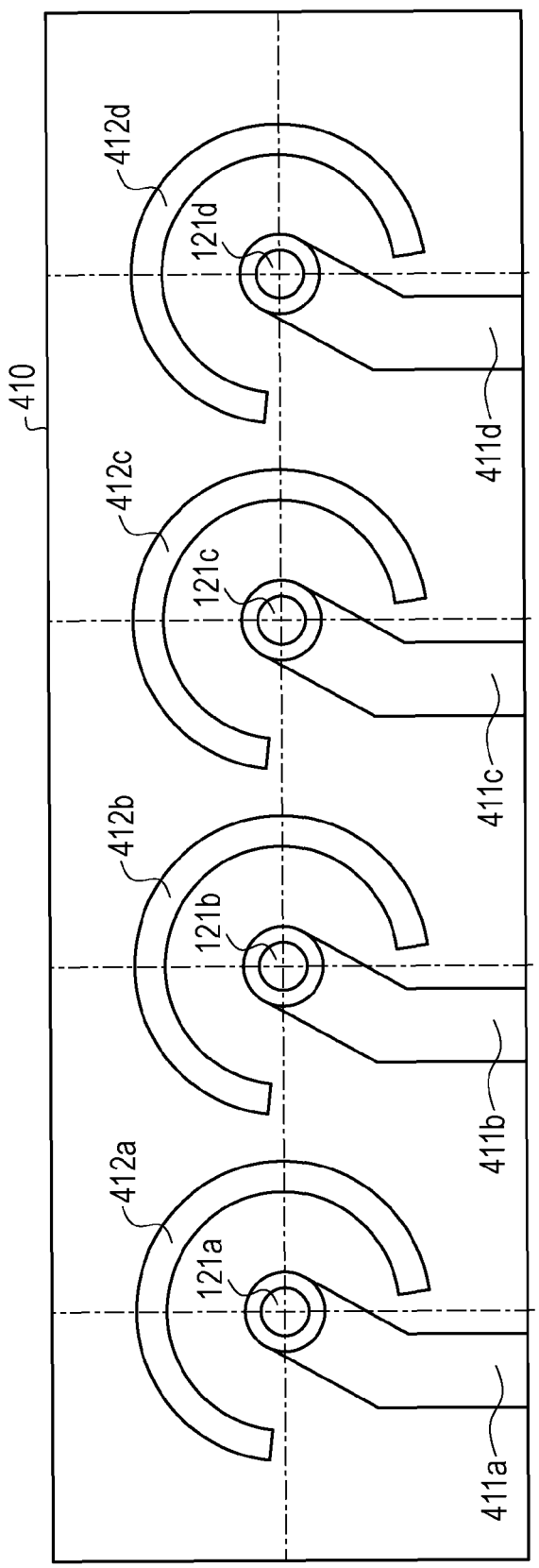

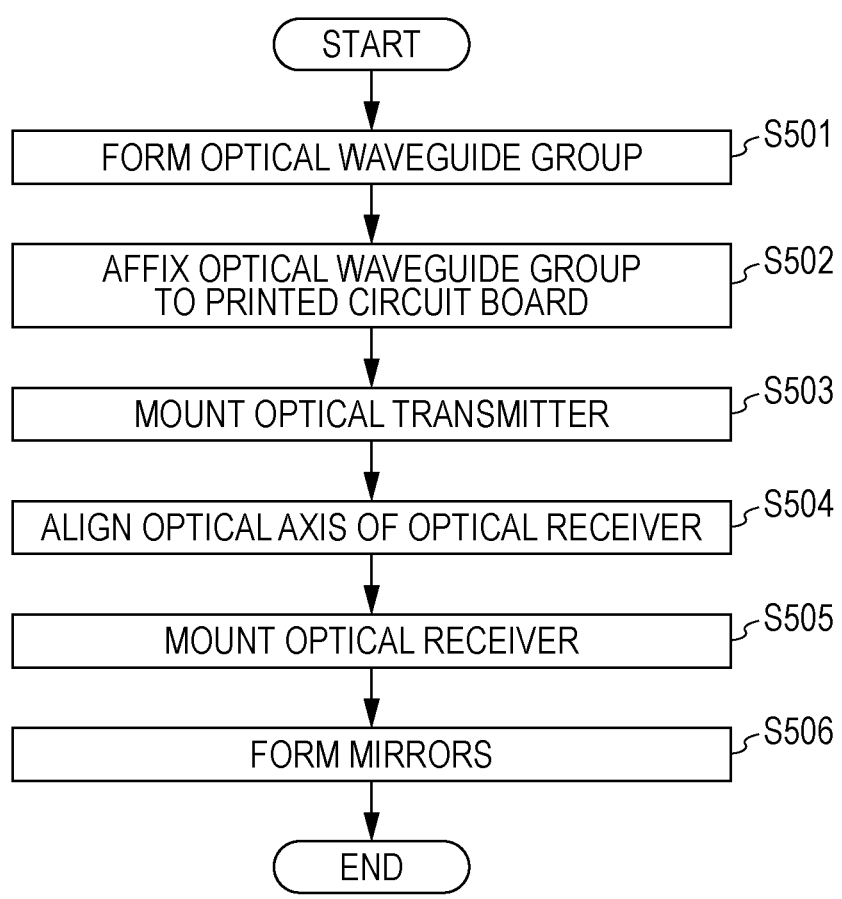

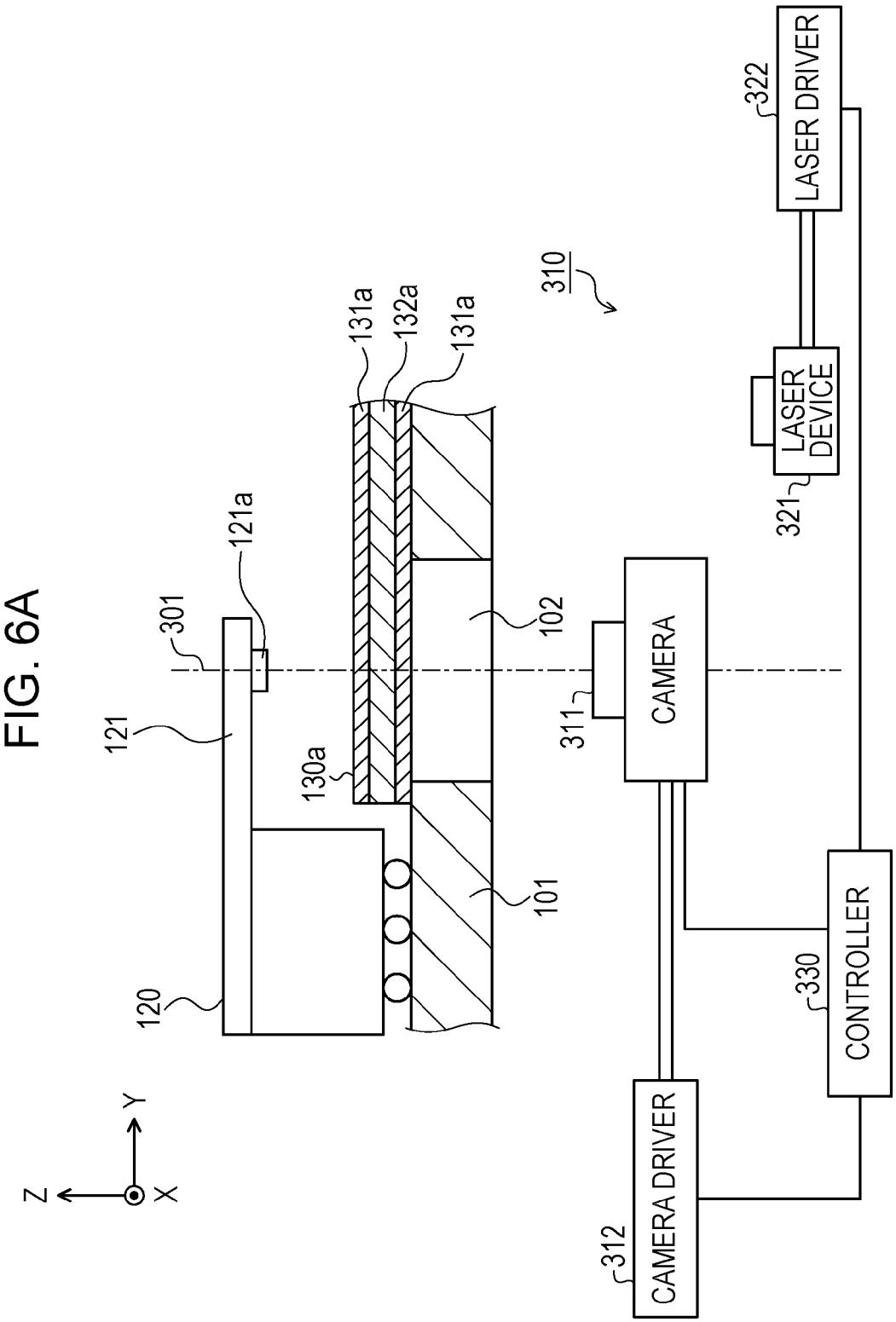

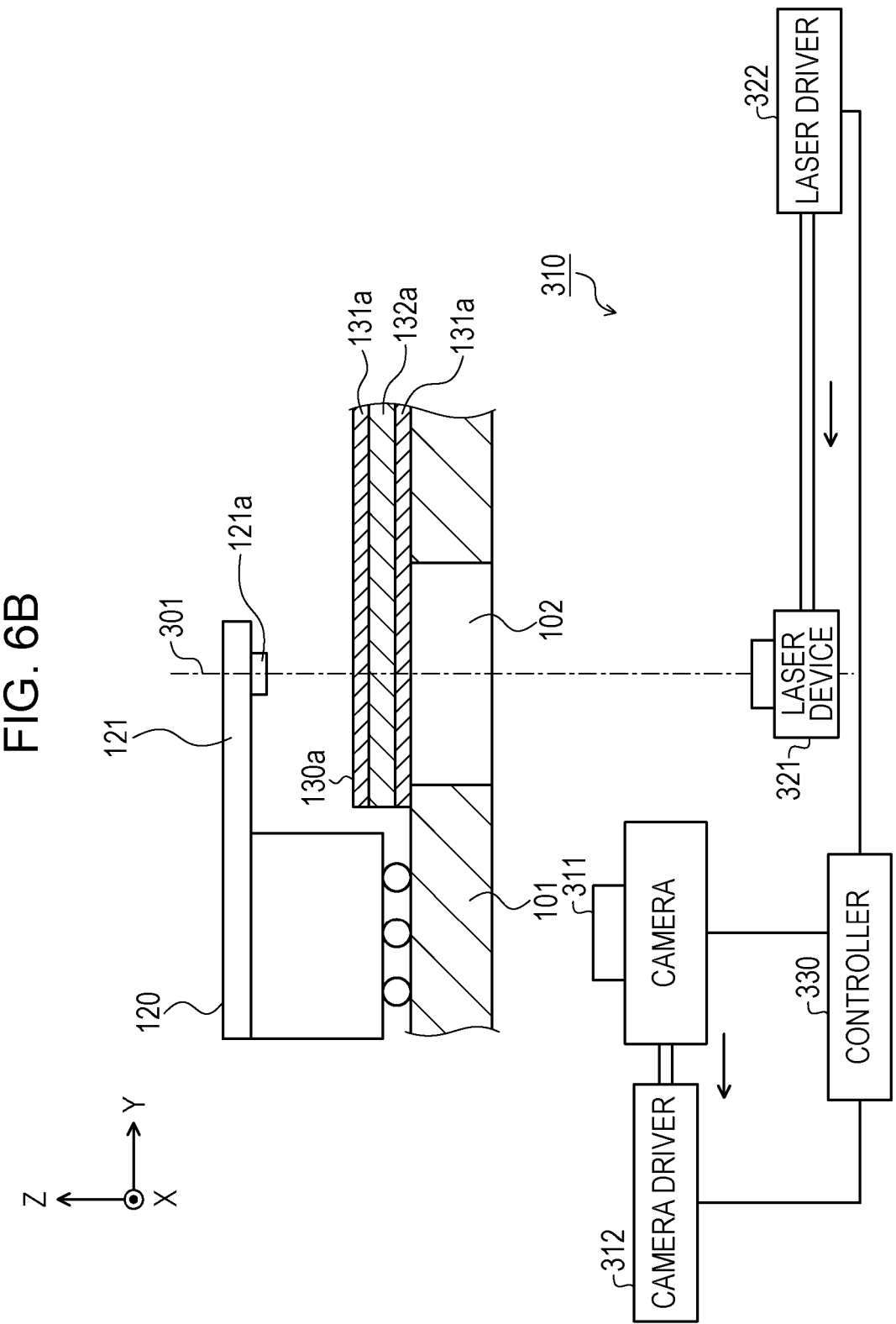

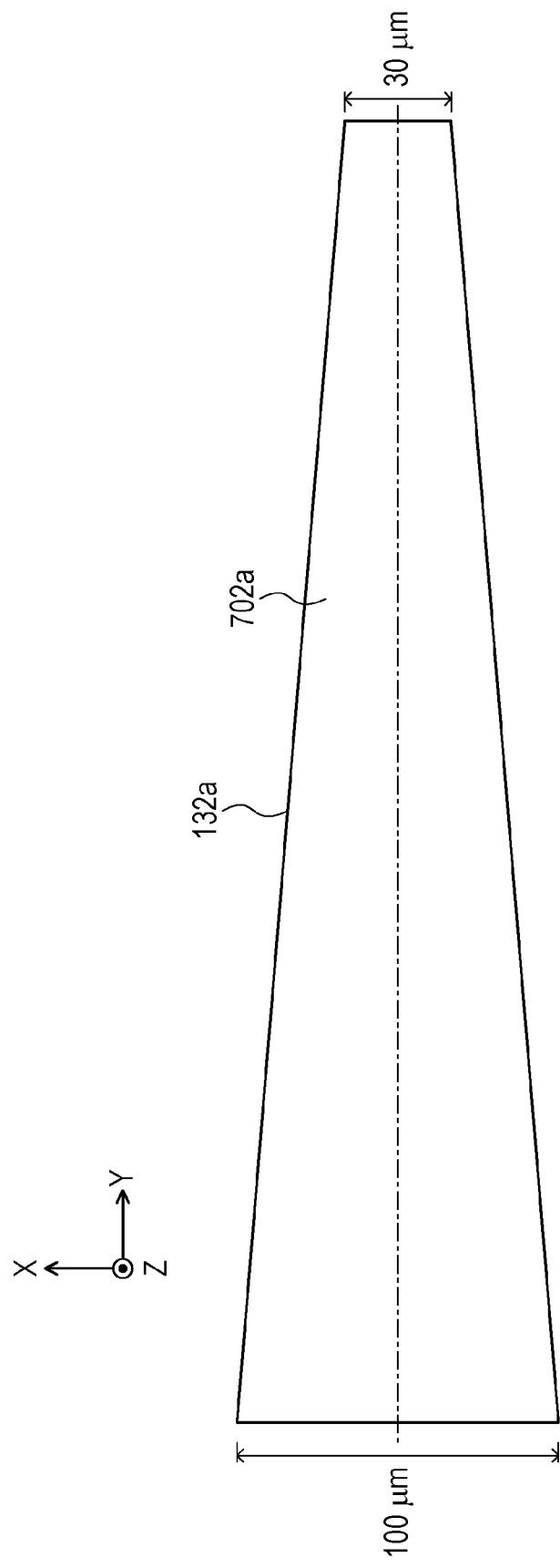

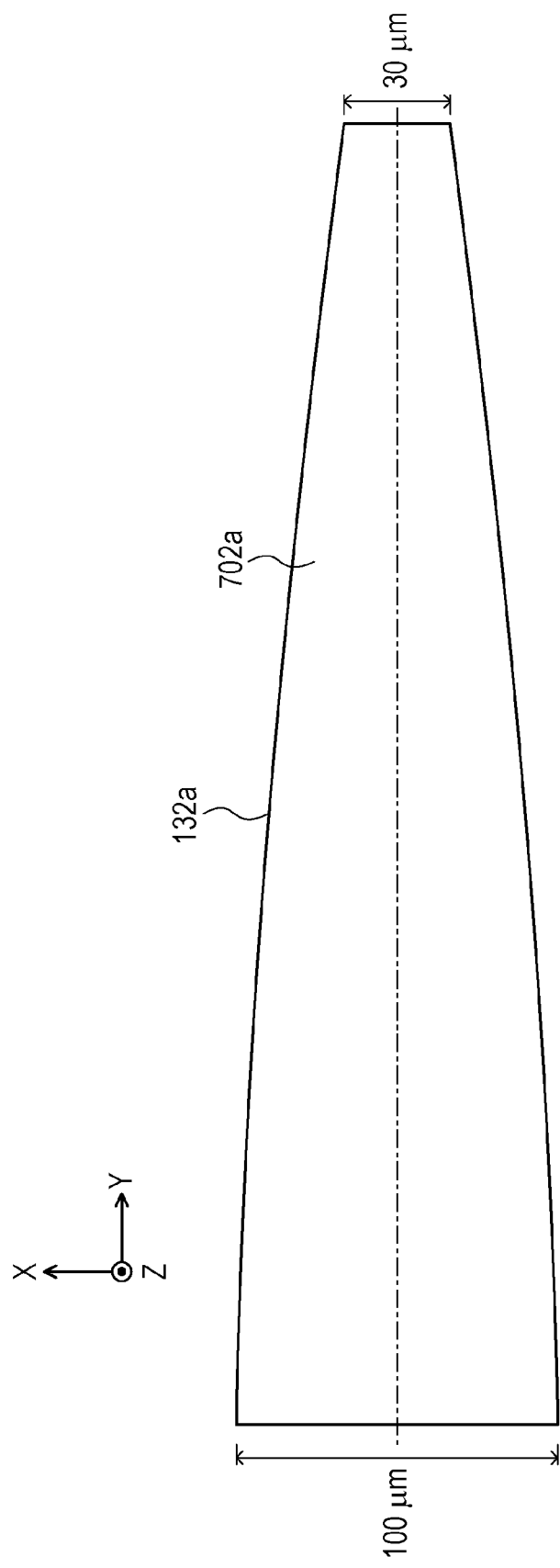

OPTICAL AXIS ADJUSTMENT METHOD FOR OPTICAL INTERCONNECTION, AND OPTICAL INTERCONNECTION SUBSTRATE

CROSS-REFERENCE TO RELATED APPLICATION

This application is based upon and claims the benefit of priority of the prior Japanese Patent Application No. 2015-002685, filed on Jan. 8, 2015, the entire contents of which are incorporated herein by reference.

FIELD

The embodiments discussed herein are related to an optical axis adjustment method for optical interconnection and an optical interconnection substrate.

BACKGROUND

Optical devices and optical waveguides are aligned with each other.

Related art is described in Japanese Laid-open Patent Publication No. 2005-265885 or Japanese Laid-open Patent Publication No. 2003-270462.

SUMMARY

According to an aspect of the embodiments, an optical axis adjustment method for optical interconnection, includes: providing, on a substrate, an optical transmitter including light sources and a mark for acquiring a position of each of the light sources; providing, on the substrate, an optical waveguide including cores each allowing light emitted from the respective light sources to propagate through the core; determining a first position based on the mark as a position of each of the light sources; and forming, at a second position in the optical waveguide corresponding to the first position, first mirrors configured to reflect the light emitted from the respective light sources and make the light propagate through the respective cores.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2B illustrates an example of a perspective view of light sources and mirrors with their optical axes out of alignment;

FIG. 2D illustrates an example of a perspective view of a state in which optical axes of mirrors are adjusted at a receiving side;

FIG. 3 illustrates an example of a machining apparatus for forming a mirror;

FIGS. 4A to 4C illustrate an example of an alignment mark;

FIG. 5 illustrates an example of a process for manufacturing an optical interconnection substrate;

FIGS. 6A to 6C illustrate an example of a mirror forming process;

FIG. 10B illustrates an example of a top view of a core of an optical waveguide;

FIG. 11B illustrates an example of a top view of a core of an optical waveguide.

DESCRIPTION OF EMBODIMENTS

For alignment between optical devices and optical waveguides, for example, an optical device and an optical waveguide are each provided with an alignment marker. For example, the optical waveguide has such a geometry that its core width gradually decreases linearly toward the light emitting side.

For example, in an optical coupling structure including an optical waveguide formed on a substrate, the optical waveguide has a core width that is narrower at its light emitting edge than at its beam incident edge.

For example, if three or more channels exist, accurate optical axis alignment may be difficult to achieve for channels other than those at both ends.

Figure 1:
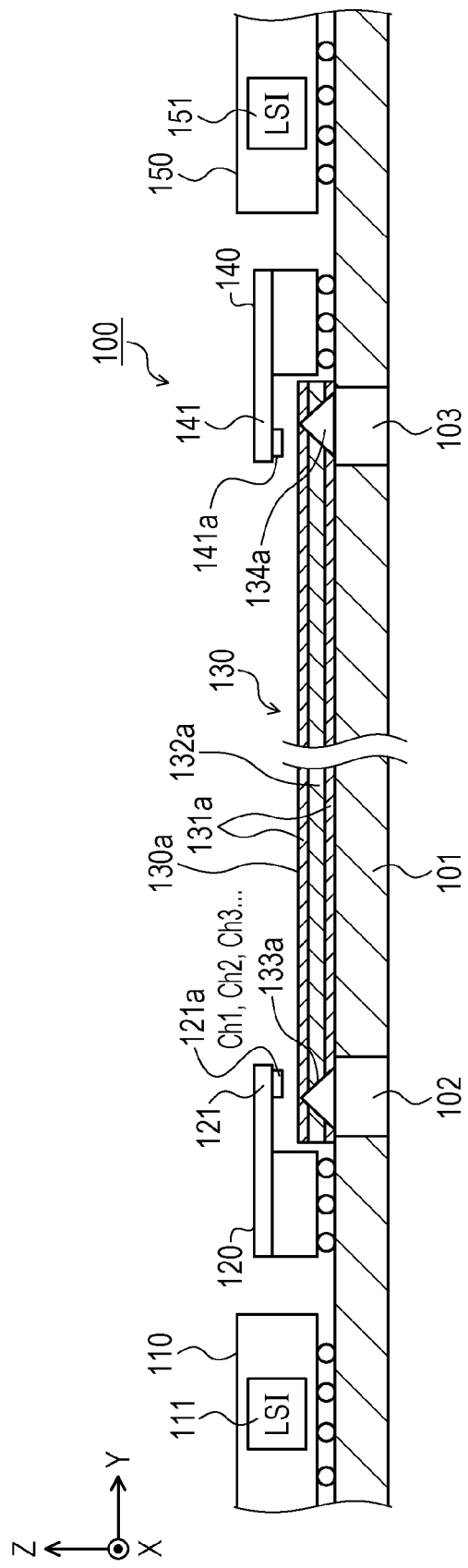
FIG. 1 illustrates an example of an optical interconnection substrate.

FIG. 1 illustrates an example of an optical interconnection substrate. As illustrated as FIG. 1, an optical interconnection substrate 100 includes a printed circuit board (PCB) 101, a first circuit 110, an optical transmitter 120, an optical waveguide group 130, an optical receiver 140, and a second circuit 150.

In FIG. 1, the Z-axis direction is a direction perpendicular to the mounting surface of the printed circuit board 101. The Y-axis direction, which is parallel to the mounting surface of the printed circuit board 101, is a direction in which light travels in the optical waveguide group 130. The X-axis direction, which is parallel to the mounting surface of the printed circuit board 101, is a direction perpendicular to the Y-axis direction.

In the optical interconnection substrate 100, the first circuit 110, the optical transmitter 120, the optical waveguide group 130, the optical receiver 140, and the second circuit 150 are mounted on the printed circuit board 101. The first circuit 110 and the second circuit 150 are coupled by optical interconnection using the optical transmitter 120, the optical waveguide group 130, and the optical receiver 140. Thus, signals are transmitted from the first circuit 110 to the second circuit 150.

The printed circuit board (PCB) 101 may be, for example, a motherboard. The first circuit 110 and the second circuit 150 respectively include large scale integrations (LSIs) 111 and 151. The LSIs 111 and 151 may be LSIs that process information.

The optical transmitter 120 is electrically coupled to the first circuit 110 via the printed circuit board 101. The optical transmitter 120 includes a light source array 121. The light source array 121 has a plurality of light sources arrayed in the X-axis direction which correspond to a plurality of channels (Ch1, Ch2, Ch3, and so on). The light sources included in the light source array 121 emit light in the Z-axis direction (downward in FIG. 1) toward the corresponding optical waveguides included in the optical waveguide group 130.

Each of the light sources in the light source array 121 may be, for example, a laser diode (LD) such as a vertical cavity surface emitting laser (VCSEL).

For example, a light source 121a illustrated as FIG. 1 is a light source for Ch1 included in the light source array 121. The light source 121a oscillates and emits light based on an electrical signal that is output from the first circuit 110 via the printed circuit board 101. The other light sources in the light source array 121 respectively corresponding to Ch2, Ch3, and so on may be similar to the light source 121a corresponding to Ch1.

The optical waveguide group 130 includes a plurality of optical waveguides stacked on the printed circuit board 101 in correspondence to the channels (Ch1, Ch2, Ch3, and so on). Each of the optical waveguides included in the optical waveguide group 130 is, for example, a polymer waveguide made of a polymer material. The optical waveguide group 130 may be formed by photolithography, for example.

For example, an optical waveguide 130a illustrated as FIG. 1 is an optical waveguide for Ch1 included in the optical waveguide group 130. The optical waveguide 130a has a clad 131a, and a core 132a surrounded by the clad 131a. The core 132a has a higher refractive index than the clad 131a. Forming the optical waveguide 130a by photolithography or any other suitable method allows the core 132a to have a uniform height (for example, 30 µm).

The optical waveguide 130a has a mirror 133a at a position corresponding to the light source 121a. The optical waveguide 130a has a mirror 134a in an end portion on the side of the optical receiver 140. Each of the mirrors 133a and 134a is, for example, a space provided in the optical waveguide 130a. In FIG. 1, the mirrors 133a and 134a are boundary surfaces of the optical waveguide 130a formed by chipping both end portions of the optical waveguide 130a away in the shape of a triangular pyramid.

The mirrors 133a and 134a are formed as follows. For example, the printed circuit board 101 is provided with cavities 102 and 103. The cavities 102 and 103 are formed by molding at the time of manufacture of the printed circuit board 101, for example. The cavities 102 and 103 may be provided by plastic forming after the printed circuit board 101 is formed.

The mirror 133a is formed in the optical waveguide 130a by cutting a part of the optical waveguide 130a from the side of the printed circuit board 101 by, for example, laser radiation using the cavity 102. The mirror 134a is formed in the optical waveguide 130a by cutting a part of the optical waveguide 130a from the side of the printed circuit board 101 using the cavity 103.

Each of the cavities 102 and 103 is, for example, a space (air). The cavities 102 and 103 may be filled with a material that has substantially the same thickness as the printed circuit board 101 and transmits laser light. This may provide a dustproofing effect, and may reduce a decrease in the strength of the printed circuit board 101. For example, glass, acrylic, or resin such as polycarbonate may be used as the material that transmits laser light.

The cavities 102 and 103 may be filled with resin or any other suitable material after the mirrors 133a and 134a are formed. The resin used in this case may not be a material that transmits laser light. For example, the cavities 102 and 103 may be closed by, for example, a seal affixed from the bottom of the printed circuit board 101.

The mirror 133a reflects light emitted from the light source 121a such that the light enters the core 132a. After entering the core 132a from the mirror 133a, the light propagates down the core 132a with being totally reflected at the interface between the clad 131a and the core 132a as the light propagates down the core 132a. The mirror 134a reflects light propagated through the core 132a such that the light escapes in the Z-axis direction (upward in FIG. 1). The other optical waveguides in the optical waveguide group 130 corresponding to Ch2, Ch3, and so on may be configured similarly to the optical waveguide 130a corresponding to Ch1.

The optical receiver 140 is electrically coupled to the second circuit 150 via the printed circuit board 101. The optical receiver 140 includes a light receiving unit array 141. The light receiving unit array 141 has a plurality of light receiving units arrayed in the X-axis direction which correspond to the channels (Ch1, Ch2, Ch3, and so). The light receiving units in the light receiving unit array 141 receive light emitted from the corresponding optical waveguides included in the optical waveguide group 130. Each of the light receiving units included in the light receiving unit array 141 is, for example, a photo diode (PD).

For example, a light receiving unit 141a illustrated as FIG. 1 is a light receiving unit for Ch1 included in the light receiving unit array 141. The light receiving unit 141a receives light exiting the mirror 134a. Then, the light receiving unit 141a outputs an electrical signal based on the received light to the second circuit 150 via the printed circuit board 101. The other light receiving units in the light receiving unit array 141 respectively corresponding to Ch2, Ch3, and so on may be configured similarly to the light receiving unit 141a corresponding to Ch1.

Figure 2A:
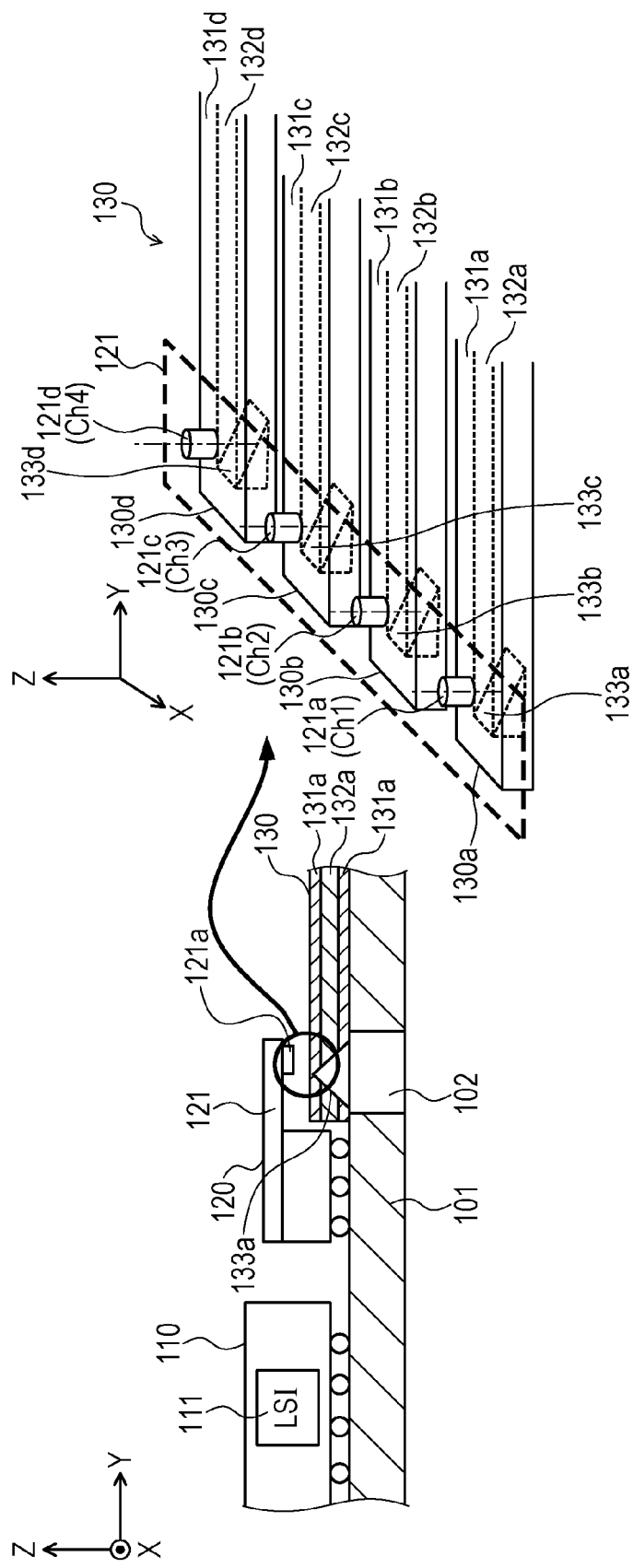
FIG. 2A illustrates an example of a state in which no optical axis misalignment exists between light sources and mirrors.

FIG. 2A illustrates an example of a state in which no optical axis misalignment exists between light sources and mirrors. In FIG. 2A, portions that are similar to those in FIG. 1 are denoted by the same reference signs and their repetitive description may be omitted or reduced. The perspective view on the right-hand side of FIG. 2A illustrates the light source array 121, and an end portion of the optical waveguide group 130 on the side of the light source array 121. FIG. 2A illustrates an arrangement of four channels (Ch1 to Ch4) as an example.

For example, the light source array 121 has light sources 121a to 121d respectively corresponding to Ch1 to Ch4. The optical waveguide group 130 includes optical waveguides 130a to 130d respectively corresponding to Ch1 to Ch4. Clads 131a to 131d respectively correspond to the optical waveguides 130a to 130d. Cores 132a to 132d respectively correspond to the optical waveguides 130a to 130d. Mirrors 133a to 133d are respectively provided in portions of the optical waveguides 130a to 130d on the side of the light source array 121.

FIG. 2A illustrates an ideal state with no manufacturing variations among the light sources 121a to 121d and the mirrors 133a to 133d. Accordingly, aligning the relative position between the light source 121a and the mirror 133a, and the relative position between the light source 121d and the mirror 133d, for example, achieves alignment between the light source and the mirror for each channel.

In FIG. 2A, the optical axis (alternate long and short dash line) of the light source 121a, and the optical axis (alternate long and short dash line) of the mirror 133a are aligned with each other. Likewise, the optical axes of the light sources 121b to 121d and the respective optical axes of the mirrors 133b to 133d are respectively aligned with each other. The optical axis of a light source or a light receiving unit refers to, for example, an axis along the Z-axis direction that is aligned with the axis of rotational symmetry of the light source or the light receiving unit. The optical axis of a mirror refers to, for example, an axis along the Z-axis direction that passes through the center of the mirror.

FIG. 2B illustrates an example of a perspective view of light sources and mirrors with their optical axes out of alignment. In FIG. 2B, portions similar to those illustrated as FIG. 2A may be denoted by the same reference signs and their repetitive description may be omitted or reduced. In FIG. 2B, manufacturing variations among the light sources 121a to 121d and the mirrors 133a to 133d cause optical-axis misalignment 261 between the optical axis (alternate long and short dash line) of the light source 121b and the optical axis (alternate long and short dash line) of the mirror 133b. Likewise, optical axis misalignment occurs also between the optical axes of the light source 121a, 121c, and 121d and the center positions of the corresponding mirrors 133a, 133c, and 133d.

Figure 2C:
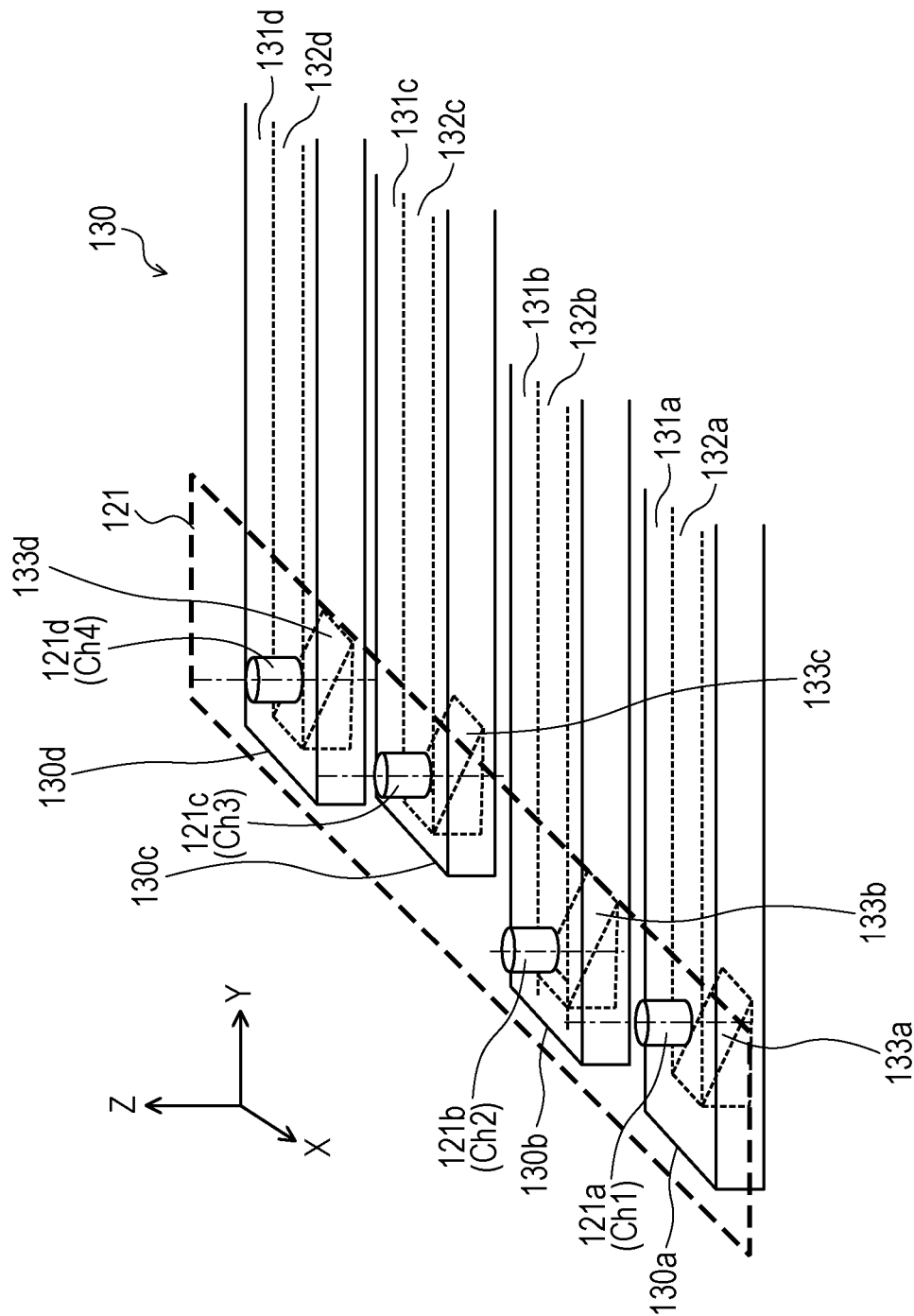
FIG. 2C illustrates an example of a perspective view of a state in which optical axes of mirrors are adjusted at a transmitting side.

FIG. 2C illustrates an example of a perspective view of a state in which optical axes of mirrors are adjusted at a transmitting side. In FIG. 2C, portions similar to those illustrated as FIG. 2A may be denoted by the same reference signs and their repetitive description may be omitted or reduced. Although manufacturing variations exist among the light sources 121a to 121d and the mirrors 133a to 133d in FIG. 2C, the mirrors 133a to 133d are formed at positions respectively aligned with the light sources 121a to 121d by use of the cavity 102 illustrated as FIG. 1. Consequently, the optical axes (alternate long and short dash lines) of the light sources 121a to 121d are respectively aligned with the optical axes (alternate long and short dash lines) of the mirrors 133a to 133d.

FIG. 2D illustrates an example of a perspective view of a state in which optical axes of mirrors are adjusted at a receiving side. In FIG. 2D, portions similar to those illustrated as FIG. 2C may be denoted by the same reference signs and their repetitive description may be omitted or reduced. Similar alignment may be performed at the receiving side if a plurality of mirrors corresponding to the individual light receiving units of the light receiving unit array 141 are formed also at the receiving side.

Mirrors 134a to 134d illustrated as FIG. 2D are respectively located in portions of the optical waveguides 130a to 130d on the side of the light receiving unit array 141, in correspondence to Ch1 to Ch4. Light receiving units 141a to 141d, which are included in the light receiving unit array 141, respectively correspond to Ch1 to Ch4.

Alignment between the mirrors 134a to 134d and the corresponding light receiving units 141a to 141d may be similar to the alignment between the light sources 121a to 121d and the corresponding mirrors 133a to 133d. Thus, the optical axes (alternate long and short dash lines) of the mirrors 134a to 134d are respectively aligned with the optical axes (alternate long and short dash lines) of the light receiving units 141a to 141d.

FIG. 3 illustrates an example of a machining apparatus for forming a mirror. An optical axis 301 illustrated as FIG. 3 is the optical axis of the light source 121a. A collimating lens 302 illustrated as FIG. 3, which is located between the light source 121a and the optical waveguide 130a, collimates light emitted from the light source 121a. The collimating lens 302 may not be provided when the mirror 133a is formed.

A machining apparatus 310 illustrated as FIG. 3 forms the mirror 133a by machining the optical waveguide 130a. The machining apparatus 310 includes a camera 311, a camera driver 312, a laser device 321, a laser driver 322, and a controller 330.

The camera 311 is a digital camera that captures an image of the light source 121a from the side of the printed circuit board 101 through the cavity 102. The collimating lens 302 and the optical waveguide 130a are transparent components, thus allowing the camera 311 to capture an image of the light source 121a from the side of the printed circuit board 101.

The camera driver 312 drives the camera 311 under control by the controller 330. For example, the camera driver 312 moves the camera 311 to either a position that allows the camera 311 to capture an image of the light source 121a, or a position in which the camera 311 does not block laser radiation emitted from the laser device 321.

The laser device 321 irradiates the optical waveguide 130a with laser light through the cavity 102 to cut a part of the optical waveguide 130a, thus forming the mirror 133a. The laser device 321 used may be, for example, an ultra-violet laser device such as an excimer laser.

The laser driver 322 drives the laser device 321 under control by the controller 330. For example, the laser driver 322 drives the laser device 321 to either a position that allows the laser device 321 to irradiate the optical waveguide 130a with laser light through the cavity 102, or another position. The laser driver 322 controls laser radiation emitted by the laser device 321 while adjusting the position of the laser device 321, thereby forming the mirror 133a in the optical waveguide 130a. The laser device 321 may be fixed to such a position that allows the laser device 321 to irradiate the optical waveguide 130a with laser light through the cavity 102.

The controller 330 controls the camera driver 312 and the laser driver 322 to form the mirror 133a at a position aligned with the optical axis 301 of the light source 121a.

The machining apparatus 310 may also form the mirrors 133b to 133d and the mirrors 134a to 134d in a manner similar to the mirror 133a. In this case, the camera 311 may capture images of the light sources 121a to 121d all at once, for example. The camera 311 may capture images of the light receiving units 141a to 141d all at once, for example.

Figure 4B:
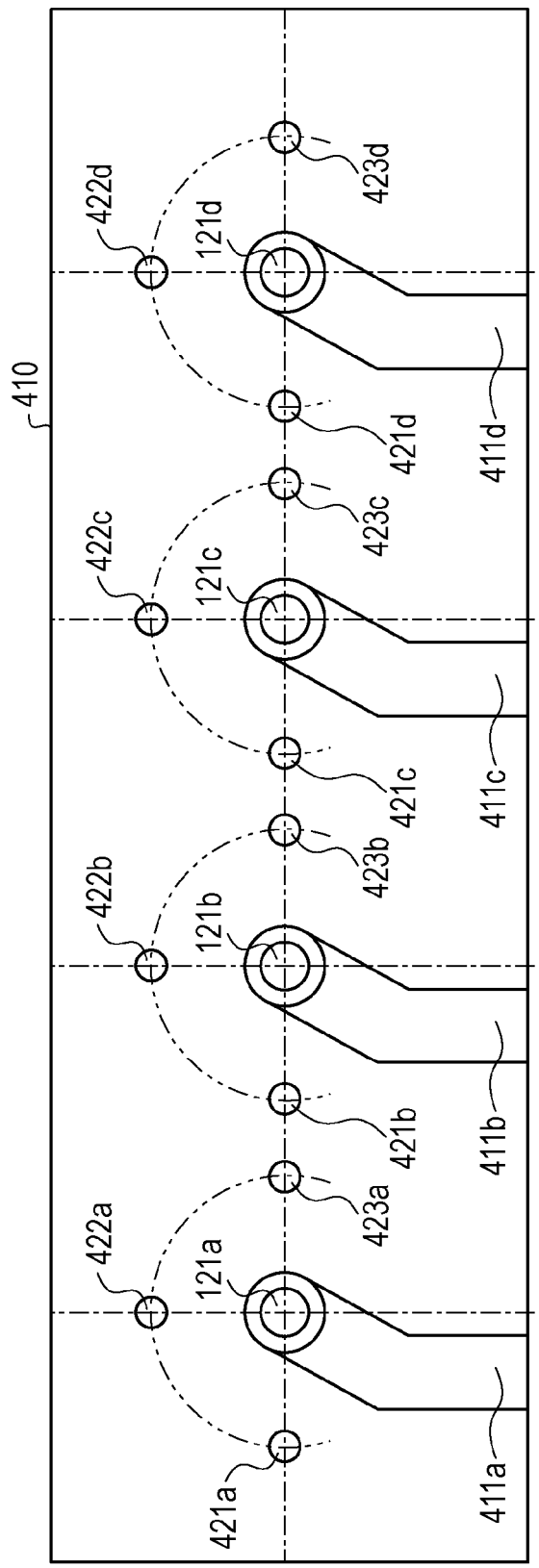
Figure 4C:
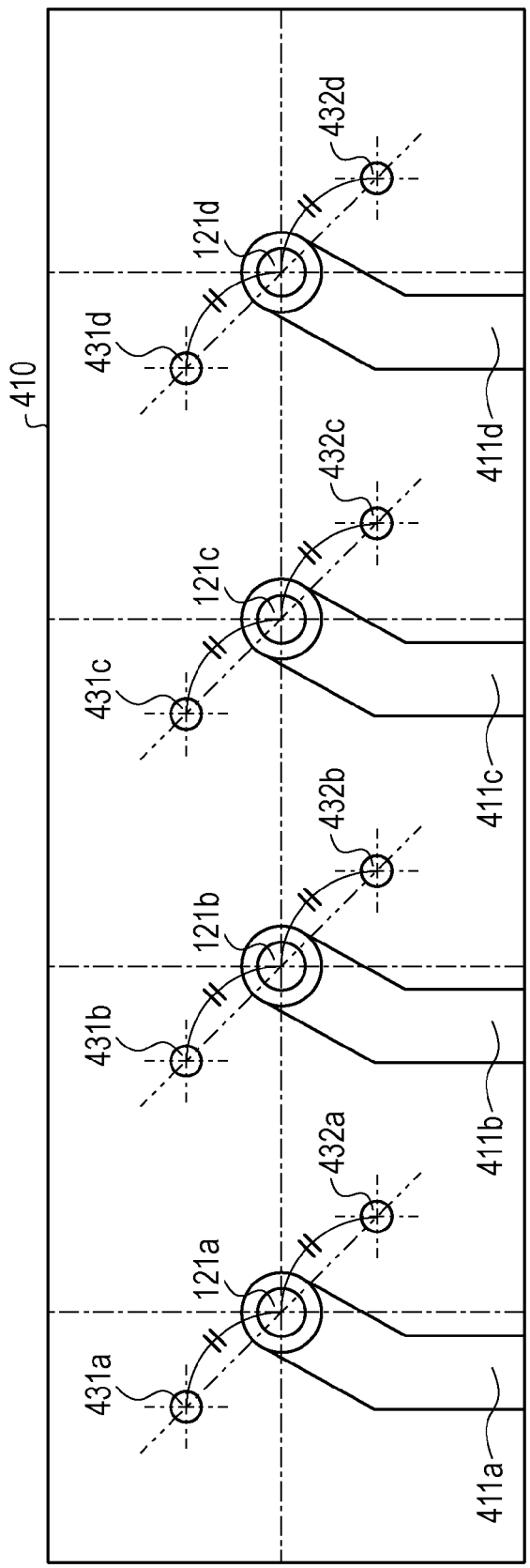

FIGS. 4A to FIG. 4C each illustrate an example of an alignment mark. Image data 410 illustrated as FIG. 4A is a visualized representation of digital image data generated by the camera 311. The image data 410 illustrated as FIG. 4A is obtained, for example, when images of the light sources 121a to 121d are captured at once by the camera 311. Wiring patterns 411a to 411d are the respective wiring patterns (electrodes) of the light sources 121a to 121d.

Markers 412a to 412d are alignment marks (marks) provided on the surface of the light source array 121 so as to respectively surround the light sources 121a to 121d. The markers 412a to 412d are markers in the shape of a circular arc (wide circular arc) whose centers are respectively coincident with the optical axes of the light sources 121a to 121d. Consequently, the positions of the optical axes of the light sources 121a to 121d may be respectively determined based on the positions of the markers 412a to 412d, even if the light sources 121a to 121d are small and thus it is difficult to directly determine the positions of the optical axes of the light sources 121a to 121d from the image data 410.

For example, the controller 330 determines the positions of the markers 412a to 412d through image processing, for example, pattern recognition, based on the image data 410.

The controller 330 determines the positions of the optical axes of the light sources 121a to 121d respectively through computation based on the determined positions of the markers 412a to 412d.

The markers 412a to 412d may be dummy patterns respectively formed together with the wiring patterns 411a to 411d in the same process, for example. A dummy pattern refers to, for example, a dummy wiring pattern that is not actually used as an electrical wiring. The markers 412a to 412d may consequently be formed with minimum increase in the number of processes. The markers 412a to 412d are not limited to dummy patterns but may be markers formed by solder resist or screen printing, for example.

In FIG. 4B, portions similar to those illustrated as FIG. 4A are denoted by the same reference signs and their repetitive description may be omitted or reduced. Instead of the markers 412a to 412d illustrated as FIG. 4A, markers 421a, 422a, 423a, 421b, 422b, 423b, 421c, 422c, 423c, 421d, 422d, and 423d illustrated as FIG. 4B may be provided in the light source array 121.

The three markers 421a, 422a, and 423a are markers located on an arc whose center is coincident with the optical axis of the light source 121a. The three markers 421b, 422b, and 423b are markers located on an arc whose center is coincident with the optical axis of the light source 121b.

The three markers 421c, 422c, and 423c are markers located on an arc whose center is coincident with the optical axis of the light source 121c. The three markers 421d, 422d, and 423d are markers located on an arc whose center is coincident with the optical axis of the light source 121d.

The controller 330 determines the respective positions of the markers 421a, 422a, 423a, 421b, 422b, 423b, 421c, 422c, 423c, 421d, 422d, and 423d through image processing, for example, pattern recognition, based on the image data 410.

The controller 330 determines the position of the optical axis of the light source 121a through computation based on the determined positions of the markers 421a, 422a, and 423a. The controller 330 determines the position of the optical axis of the light source 121b through computation based on the determined positions of the markers 421b, 422b, and 423b. The controller 330 determines the position of the optical axis of the light source 121c through computation based on the determined positions of the markers 421c, 422c, and 423c. The controller 330 determines the position of the optical axis of the light source 121d through computation based on the determined positions of the markers 421d, 422d, and 423d.

The markers 421a, 422a, 423a, 421b, 422b, 423b, 421c, 422c, 423c, 421d, 422d, and 423d may be dummy patterns respectively formed together with the wiring patterns 411a to 411d in the same process, for example. The markers 421a, 422a, 423a, 421b, 422b, 423b, 421c, 422c, 423c, 421d, 422d, and 423d may consequently be formed with minimum increase in the number of processes. The markers 421a, 422a, 423a, 421b, 422b, 423b, 421c, 422c, 423c, 421d, 422d, and 423d are not limited to dummy patterns but may be markers formed by solder resist or screen printing, for example.

In FIG. 4C, portions that are similar to those in FIG. 4A may be denoted by the same reference signs and their repetitive description may be omitted or reduced. Instead of the markers 412a to 412d illustrated as FIG. 4A, markers 431a, 432a, 431b, 432b, 431c, 432c, 431d, and 432d illustrated as FIG. 4C may be provided in the light source array 121.

The two markers 431a and 432a are markers whose midpoint coincides with the optical axis of the light source 121a. The two markers 431b and 432b are markers whose midpoint coincides with the optical axis of the light source 121b. The two markers 431c and 432c are markers whose midpoint coincides with the optical axis of the light source 121c. The two markers 431d and 432d are markers whose midpoint coincides with the optical axis of the light source 121d.

The controller 330 determines the respective positions of the markers 431a, 432a, 431b, 432b, 431c, 432c, 431d, and 432d through image processing, for example, pattern recognition, based on the image data 410.

The controller 330 determines the position of the optical axis of the light source 121a through computation based on the determined positions of the markers 431a and 432a. The controller 330 determines the position of the optical axis of the light source 121b through computation based on the determined positions of the markers 431b and 432b. The controller 330 determines the position of the optical axis of the light source 121c through computation based on the determined positions of the markers 431c and 432c. The controller 330 determines the position of the optical axis of the light source 121d through computation based on the determined positions of the markers 431d and 432d.

The markers 431a, 432a, 431b, 432b, 431c, 432c, 431d, and 432d may be dummy patterns respectively formed together with the wiring patterns 411a to 411d in the same process, for example. The markers 431a, 432a, 431b, 432b, 431c, 432c, 431d, and 432d may consequently be formed with minimum increase in the number of processes. The markers 431a, 432a, 431b, 432b, 431c, 432c, 431d, and 432d are not limited to dummy patterns but may be patterns formed by solder resist or screen printing, for example.

The alignment marks used are not limited to the marks illustrated as FIGS. 4A to 4C but may be other marks. For example, any alignment marks may be used which allow for easy location of the light sources 121a to 121d by image processing, and enable the positions of the light sources 121a to 121d to be uniquely determined based on the alignment marks. Examples of alignment marks that allow for easy location of the light sources 121a to 121d by image processing may include marks that are larger than the light sources 121a to 121d and marks with higher contrast than the light sources 121a to 121d.

Other marks may be used as alignment marks that enable the positions of the light sources 121a to 121d to be uniquely determined. For example, alignment marks that enable the position of the light source 121a to be uniquely determined may be a pair of line segments whose extensions intersect at a point substantially coincident with the optical axis of the light source 121a and which are oriented in different directions. In this case, four pairs of line segments corresponding to the light sources 121a to 121d may be used.

Image data and alignment marks corresponding to the light receiving unit array 141 may be similar to the image data 410 and the alignment marks corresponding to the light source array 121 illustrated as FIGS. 4A to 4C. The adjustment method using alignment marks may be applied to only one of the light source array 121 and the light receiving unit array 141.

For example, manufacturing variations may introduce minute misalignments between the positions determined by the markers 412a to 412d, and the positions of the optical axes of the light sources 121a to 121d in FIG. 4A. For example, such a misalignment (its direction and amount) may be measured after manufacture of the light source array 121 having the markers 412a to 412d. This misalignment measurement may be performed by, for example, image processing based on image data obtained by capturing an image of the light source array 121. For example, a camera with higher resolution than the camera 311 illustrated as FIG. 3 may be used for this image capture.

The measurements of misalignment are stored in a memory in the machining apparatus 310. The controller 330 of the machining apparatus 310 corrects the positions determined by the markers 412a to 412d based on the measurements stored in the memory, and determines the corrected positions as the positions of the respective optical axes of the light sources 121a to 121d. The positions of the respective optical axes of the light sources 121a to 121d may consequently be determined with precision even in the presence of misalignment of the markers 412a to 412d due to manufacturing variations.

The same as described above with reference to FIG. 4A may apply to the marks illustrated as FIGS. 4B and 4C and other marks. Alignment marks for the light receiving unit array 141 may be configured similarly to the alignment marks for the light source array 121.

FIG. 5 illustrates an example of a process for manufacturing an optical interconnection substrate. The optical waveguide group 130 is formed by using a polymer material (operation S501). The optical waveguide group 130 formed in operation S501 is affixed to the printed circuit board 101 having the cavities 102 and 103 (operation S502).

The optical transmitter 120 is mounted on the printed circuit board 101 (operation S503). Optical axis alignment is performed for the optical receiver 140 (operation S504), and the optical receiver 140 is mounted on the printed circuit board 101 (operation S505). The optical axis alignment in operation S504 may be, for example, positioning of the optical axis of each light receiving unit in the light receiving unit array 141 of the optical receiver 140 with respect to the optical waveguide group 130.

The mirrors 133a to 133d and the mirrors 134a to 134d are respectively formed in the optical waveguides 130a to 130d of the optical waveguide group 130 by the machining apparatus 310 (operation S506), thus completing a series of operations in the manufacturing process. Operation S506 may be performed by laser radiation through the cavities 102 and 103 provided in the printed circuit board 101.

As illustrated as FIG. 5, the manufacturing process first affixes the optical waveguide group 130 to the printed circuit board 101, and then forms mirrors in individual optical waveguides by using the cavities 102 and 103 provided in the printed circuit board 101.

For example, as illustrated as FIG. 2C, the optical axes of the light sources 121a to 121d may consequently be aligned with the optical axes of the mirrors 133a to 133d, respectively, even if manufacturing variations exist among the light sources 121a to 121d and the mirrors 133a to 133d.

The optical axes of the light receiving units 141a to 141d may consequently be aligned with the optical axes of the mirrors 134a to 134d, respectively, even if manufacturing variations exist among the light receiving units 141a to 141d and the mirrors 134a to 134d.

The mirrors may be either formed at both the transmitting and receiving sides of the optical waveguide group 130 by using the cavities 102 and 103, or formed only at one of the transmitting and receiving sides. For example, the mirrors 133a to 133d may be formed at the transmitting side by using the cavity 102, whereas the cavity 103 may not be provided at the receiving side. In this case, the mirrors 134a to 134d at the receiving side may be formed in operation S501, for example.

Figure 6C:
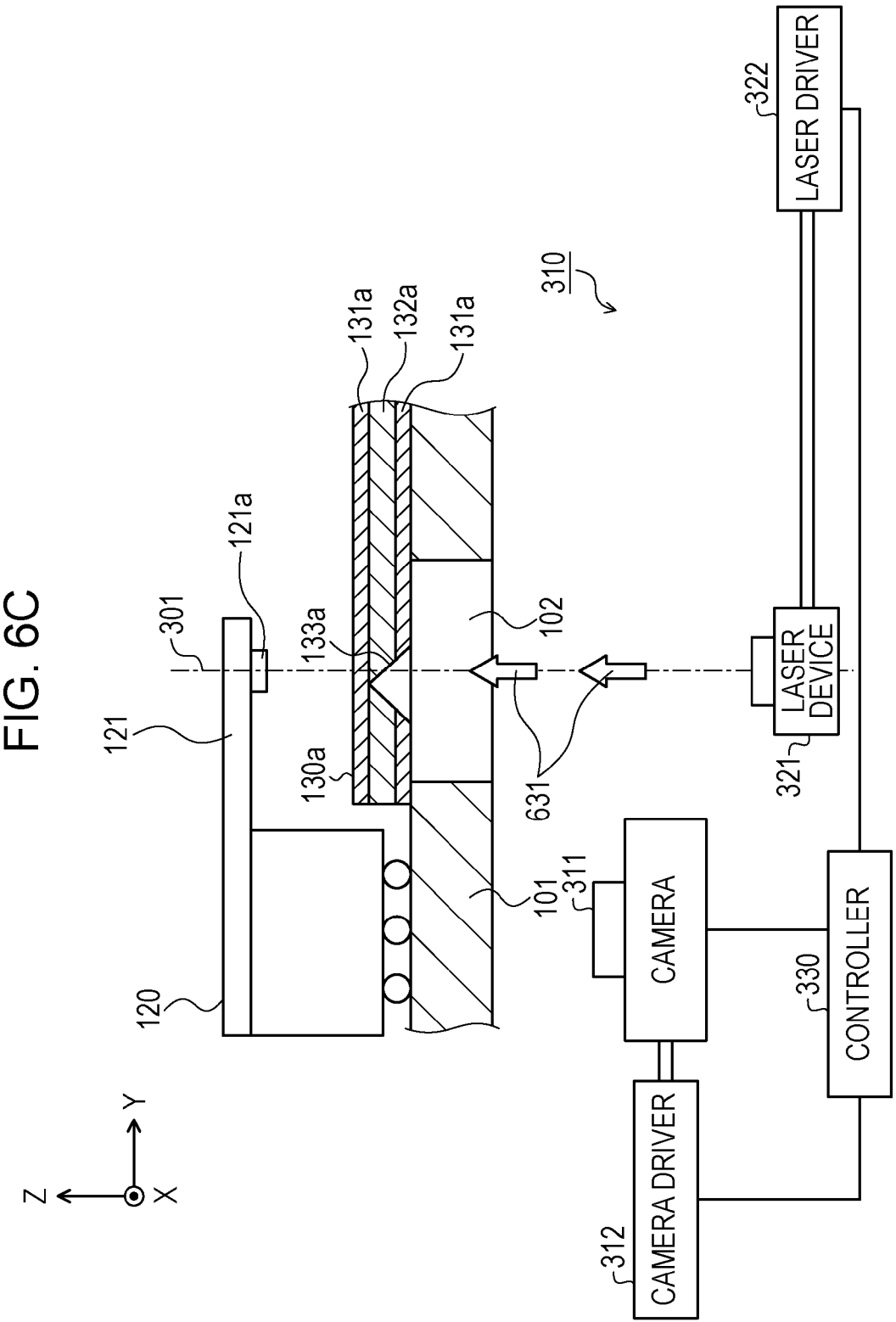

FIGS. 6A to 6C illustrate an example of a mirror forming process. FIGS. 6A to 6C, portions similar to those illustrated as FIG. 3 may be denoted by the same reference signs and their repetitive description may be omitted or reduced. In operation S506 illustrated as FIG. 5, the controller 330 may form mirrors through the process illustrated as FIGS. 6A to 6C, for example.

As illustrated as FIG. 6A, after the optical transmitter 120 and the optical waveguide group 130 are placed on the printed circuit board 101 having the cavity 102, the controller 330 controls the camera driver 312 to move the camera 311 to a position that allows the camera 311 to capture an image of the light source 121a. The controller 330 controls the camera 311 to have an image of the light source 121a captured by the camera 311, and acquires image data obtained by the image capture from the camera 311.

As illustrated as FIG. 6B, the controller 330 controls the camera driver 312 to move the camera 311 to such a position that the camera 311 does not block laser radiation emitted from the laser device 321. The controller 330 controls the laser driver 322 to move the laser device 321 to a position that allows the laser device 321 to irradiate the optical waveguide 130a with laser light through the cavity 102.

As illustrated as FIG. 6C, the controller 330 determines the position of the optical axis 301 of the light source 121a by image processing based on the acquired image data. The controller 330 controls the laser driver 322 such that laser light 631 is applied from the laser device 321 toward the determined position of the optical axis 301, thereby forming the mirror 133a.

The mirrors 133b to 133d may be formed similarly to the mirror 133a illustrated as FIGS. 6A to 6C. When forming the mirrors 133b to 133d, the controller 330 has images of the light sources 121b to 121d captured to determine the positions of the optical axes of the light sources 121b to 121d, and causes laser light to be applied toward each of the determined positions. For example, images of the light sources 121a to 121d may be captured by the camera 311 at once. In this case, the optical axes of the light sources 121a to 121d are determined based on the obtained image data.

The mirrors 134a to 134d may be formed similarly to the mirror 133a. When forming the mirrors 134a to 134d, the controller 330 has images of the light receiving units 141a to 141d captured to determine the positions of the optical axes of the light receiving units 141a to 141d, and causes laser light to be applied toward each of the determined positions. Either a single machining apparatus 310 or a plurality of machining apparatuses 310 may be used in forming the mirrors 133a to 133d and the mirrors 134a to 134d.

Figure 7:
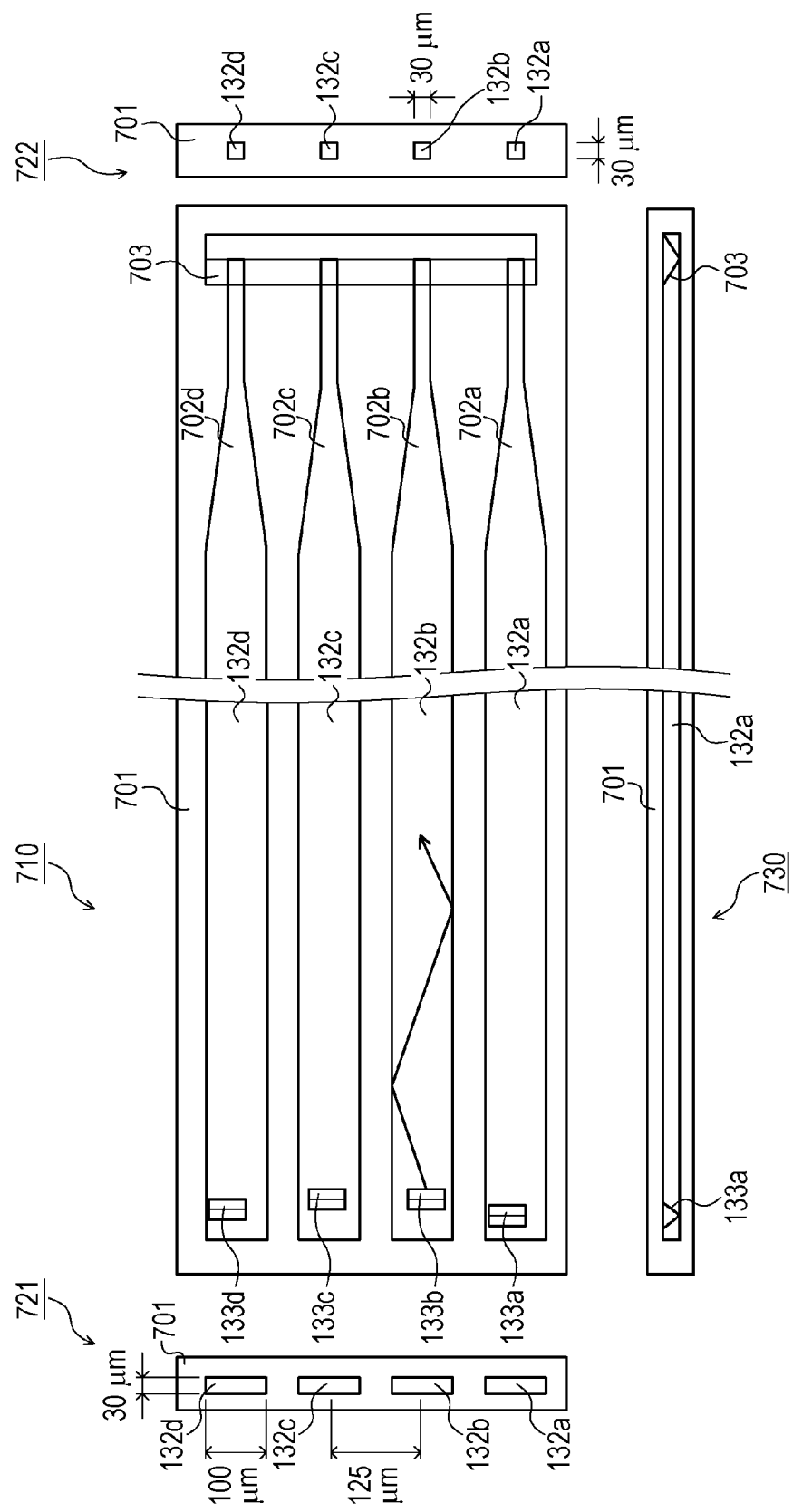
FIG. 7 illustrates an example of a geometry of an optical waveguide.
Figure 8:
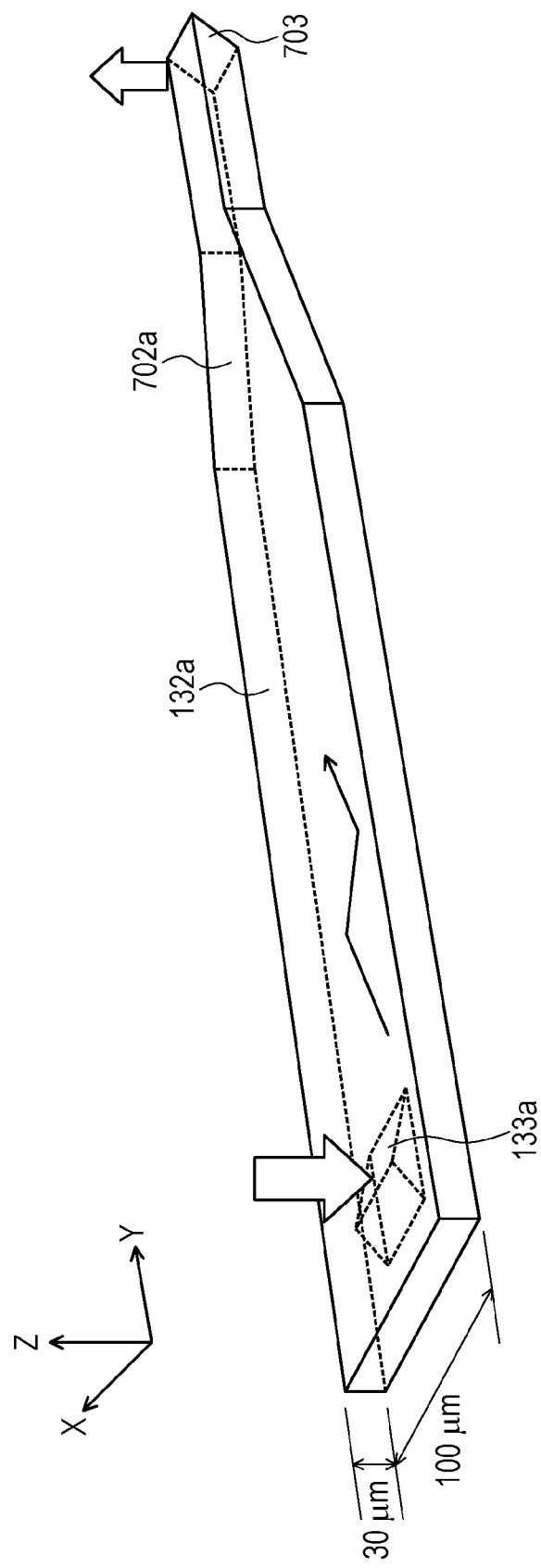
FIG. 8 illustrates an example of a perspective view of a core of an optical waveguide.

FIG. 7 illustrates an example of a geometry of optical waveguides. FIG. 8 illustrates an example of a perspective view of a core of an optical waveguide. A top view 710, side views 721 and 722, and a front view 730 illustrated as FIG. 7 are respectively the top, side, and front elevations of optical waveguides corresponding to the optical waveguide group 130. FIG. 8 is a perspective view of the core 132a. The cores 132b to 132d may have a geometry similar to the geometry of the core 132a.

A clad 701 is used instead of the clads 131a to 131d in FIGS. 7 and 8. For example, the cores 132a to 132d are surrounded by the clad 701 that is a single clad. In the example illustrated as FIGS. 7 and 8, the clads 131a to 131d may be used instead of the clad 701.

In FIGS. 7 and 8, a mirror 703 is provided instead of the mirrors 134a to 134d. The mirror 703 is formed so as to extend over the cores 132a to 132d. In FIGS. 7 and 8, the mirrors 134a to 134d for individual channels may be provided instead of the mirror 703. In FIG. 7, the cores 132a to 132d are placed at intervals of 125 μm.

As illustrated as FIGS. 7 and 8, each of the cores 132a to 132d has a smaller length in the X-axis direction in an end portion on the side of the light receiving unit array 141 than in an end portion on the side of the light source array 121. For example, in FIGS. 7 and 8, each of the cores 132a to 132d may have a length of 100 μm in the X-axis direction in an end portion on the side of the light source array 121. In contrast, each of the cores 132a to 132d may have a length of 30 μm in the X-axis direction in an end portion on the side of the light receiving unit array 141.

Consequently, for the respective end portions of the cores 132a to 132d on the side of the light source array 121, greater margins are allowed for adjustment of the positions of the mirrors 133a to 133d. For the end portions of the cores 132a to 132d on the side of the light receiving unit array 141, the emitting face is reduced in size for increased coupling tolerance. The emitting face may be a part of the cores 132a to 132d where the mirror 703 is formed.

In FIGS. 7 and 8, the cores 132a to 132d respectively have slope sections 702a to 702d (tapers) in which their length in the X-axis direction varies continuously from 100 μm to 30 μm with the position along the Y-axis. The length of the cores 132a to 132d in the X-axis direction may be substantially uniform at 100 μm on the side of the light source array 121 with reference to the slope sections 702a to 702d, and may be substantially uniform at 30 μm on the side of the light receiving unit array 141 with reference to the slope sections 702a to 702d.

Figure 9:
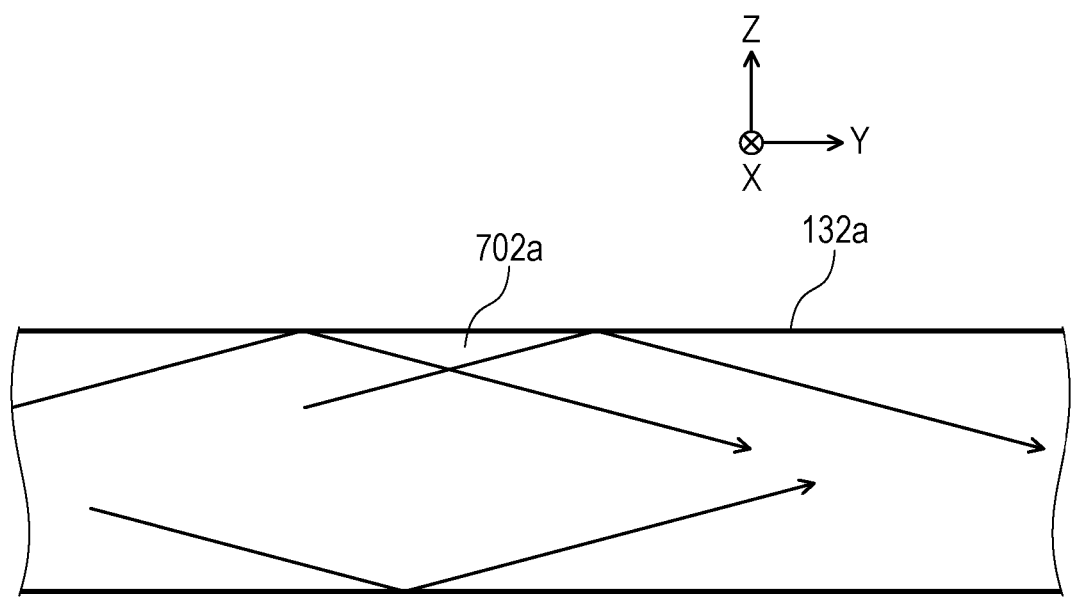
FIG. 9 illustrates an example of a front view of propagation of light in a core of an optical waveguide.

FIG. 9 illustrates an example of a front view of propagation of light in a core of an optical waveguide. The core 132a illustrated as FIGS. 7 and 8 has a length in the Z-axis direction that remains substantially the same in the slope section 702a where its length in the X-axis direction varies with the position along the Y-axis. This configuration may reduce the optical loss that occurs when light propagating in the core 132a escapes in the Z-axis direction without being totally reflected. Propagation of light in the cores 132b to 132d may be similar to the propagation of light in the core 132a.

Figure 10A:
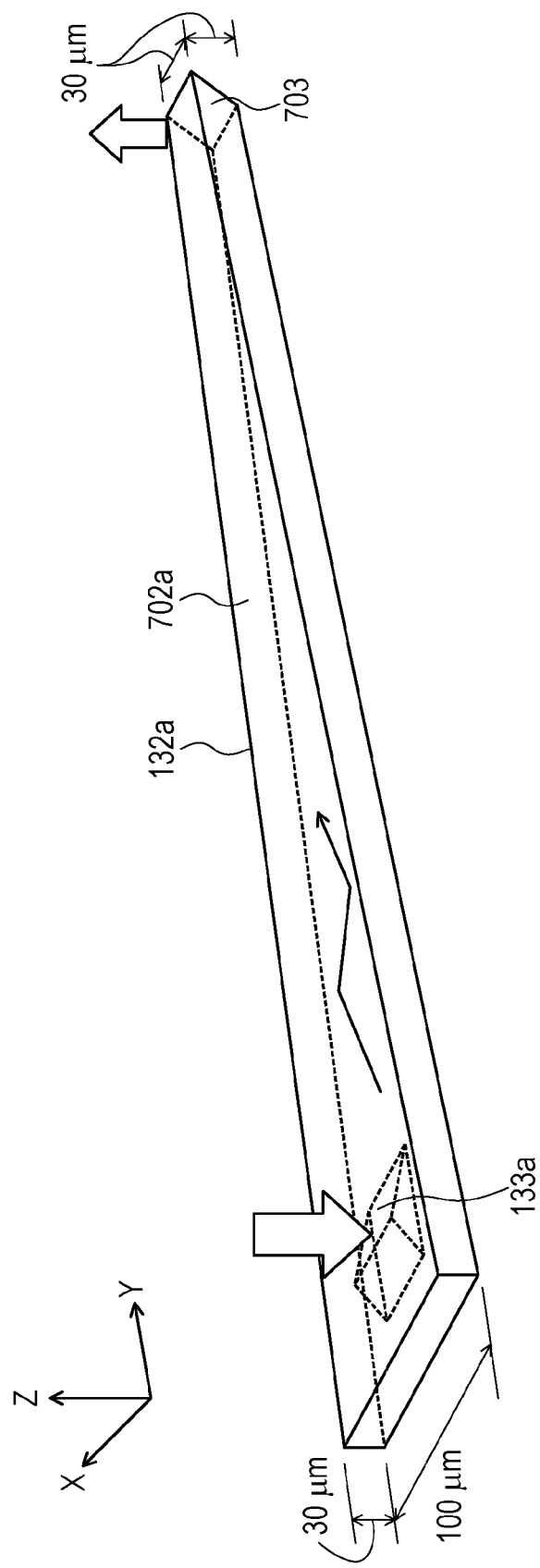
FIG. 10A illustrates an example of a perspective view of a core of an optical waveguide.

FIG. 10A illustrates an example of a perspective view of a core of an optical waveguide. FIG. 10B illustrates an example of a top view of a core of an optical waveguide. In FIGS. 10A and 10B, portions similar to those illustrated as FIG. 7 may be denoted by the same reference signs and their repetitive description may be omitted or reduced. As illustrated as FIGS. 10A and 10B, the core 132a may have the slope section 702a that extends over its entire part in the Y-axis direction and in which its length in the X-axis direction varies continuously with the position along the Y-axis.

This may cause the length in the X-axis direction of the core 132a to change more gently in in the slope section 702a, which may reduce the optical loss that occurs when light propagating in the core 132a escapes in the X-axis direction without being totally reflected. The cores 132b to 132d may have a geometry similar to the geometry of the core 132a.

Figure 11A:
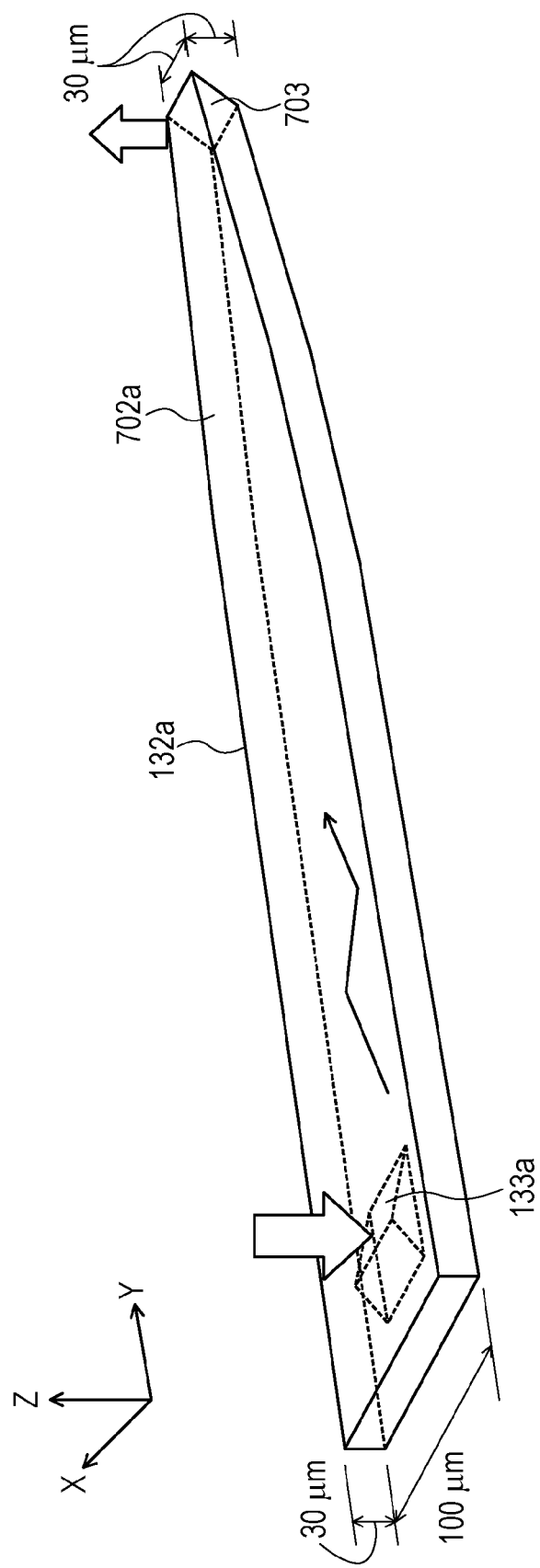
FIG. 11A illustrates an example of a perspective view of a core of an optical waveguide.

FIG. 11A illustrates an example of a perspective view of a core of an optical waveguide. FIG. 11B illustrates an example of a top view of a core of an optical waveguide. In FIGS. 11A and 11B, portions similar to those illustrated as FIG. 7 may be denoted by the same reference signs and their repetitive description may be omitted or reduced. As illustrated as FIGS. 11A and 11B, in the slope section 702a of the core 132a where the length of the core 132a along the X-axis varies continuously with the position along the Y-axis, each of its lateral faces along the X-axis may be a curved face that is convex toward the outside of the core 132a. For example, a paraboloid or a sphere may be employed for this curved face.

This configuration may allow light propagating in the core 132a to be efficiently condensed in an end portion of the core 132a on the side of the light receiving unit array 141, which may reduce the optical loss that occurs when light propagating in the core 132a escapes in the X-axis direction without being totally reflected. The geometries of the cores 132b to 132d may be similar to the geometry of the core 132a. Each lateral face along the X-axis of the slope section 702a may be a curved face that is outwardly convex, or alternatively, one of the lateral faces along the X-axis of the slope section 702a may be a planar face.

The optical transmitter 120 is provided with a mark indicating the position of each of the light sources 121a to 121d corresponding to individual channels. After the optical transmitter 120 and the optical waveguide group 130 are placed on the printed circuit board 101, each of the mirrors 133a to 133d is formed in the optical waveguide group 130 on a channel-by-channel basis by using the mark. Consequently, the optical axes of the light source and corresponding mirror may be accurately aligned for each of channels, including channels other than those at both ends.

The optical axis adjustment method for optical interconnection and the optical interconnection substrate may enable accurate optical axis alignment for channels other than those at both ends.

For example, optical wiring techniques may be adopted for high-speed and high-volume signal transmissions for reasons such as high quality and low mutual interference in high speed signal transfer. Increases in the speed of servers and data centers may lead to use of rack-to-rack optical interconnections, and may further lead to use of intra-rack board-to-board or in-board optical interconnections.

Optical interconnection involves multi-core (multi-channel) optical coupling. For example, in optical interconnection, a plurality of channels may be coupled with substantially equal precision through highly complex alignment for increased number and density of optical paths (channels). High precision optical coupling may be desired between, for example, the optical transmitter and the light receiving face of the waveguide and between the emitting face of the waveguide and the optical receiver. For example, a precision of error of ±10 μm or less may be desired for transmission rates at or above 25 Gbps.

For example, if minute misalignments due to manufacturing variations exist among individual channels on both the light source side and the waveguide side, performing alignment for a specific channel may fail to provide accurate alignment for all of the channels (see FIG. 2B, for example).

For example, in the case of a 12-channel configuration (Ch1 to Ch12), alignment may be performed for only Ch1 and Ch12 at both ends. In this case, channels (Ch2 to Ch11) other than the channels at both ends may still have misalignments relative to each other introduced by manufacturing variations.

Optical interconnection involves optimization of core diameter at the entrance side and the emitting sides. For example, larger core sizes of the waveguide normally lead to higher efficiency at the transmitting side (entrance side)

where light emitted from the light source is to be directed into the core of the waveguide. In contrast, smaller core sizes lead to higher efficiency at the receiving side (emitting side) where light emitted from the entire face of the core is to be received by the light receiving unit.

For example, a waveguide may have a cross section that is uniform from the transmitting side all the way to the emitting side, such as a rectangular parallelepiped. This cross-sectional geometry may make it difficult to optimize efficiency at the transmitting side and the receiving side. For example, for tapered waveguides, it may be difficult to fabricate such waveguides that their height (thickness) varies with the propagation direction of light. A difference in the height of an optical waveguide between the transmitting side and the receiving side may lead to, for example, asymmetry between the optical transmitter and the optical receiver, and consequently to reduced handling ease.

An issue in optical interconnection may be the size of the light source that serves as an alignment mark. For example, to precisely align the light source or light receiving unit on each channel with the center of the corresponding mirror part provided on the waveguide, the light source or light receiving unit itself is recognized as an alignment mark through image processing using a camera, and aligned with the center of the mirror part.

Such a light source or light receiving unit may typically be very small (for example, 20 μm or less). This small size may make it difficult to precisely determine the position of the light source or light receiving unit with a given piece of equipment. Although such a light source or light receiving unit may be recognized by using, for example, high-resolution cameras that produce images resilient to distortion when magnified, such a system may be expensive.

The center of a light source is recognized by a camera over a waveguide through a cavity in a substrate that is installed in advance, and a mirror is machined for each individual channel while aiming at the center of the light source (see FIG. 3 and FIGS. 6A to 6C, for example). This may lead to improved coupling efficiency at the mirror on each individual channel.

A marker in the shape of, for example, a circular arc whose center is aligned with the corresponding light source or light receiving unit is placed on the substrate of the component on which the light source or light receiving unit is mounted (for example, FIGS. 4A to 4C), and laser light is emitted toward the center of the marker while recognizing the position of the center of the marker. This may allow accurate alignment of the mirror even in situations where the light source or light receiving unit is small and thus difficult to be used as an alignment mark.

As for a minute misalignment between the center of the marker and the center of the light source or light receiving part introduced by manufacturing variations, the amount of misalignment between the centers is measured in advance independently for each discrete component. The misalignment may be cancelled by reflecting the measured amount of misalignment on the system to be machined, and compensating for the amount of misalignment at the time of machining the mirror.

The geometry of the waveguide may be such that the waveguide has an increased core width at the transmitting side to allow a sufficient margin for adjustment of the mirror positions. At the receiving side, the core width of the waveguide may gradually decrease toward the emitting side, thus making the emitting face smaller for increased coupling tolerance (for example, FIGS. 7, 8, and 10A to 11B). This configuration may reduce the optical loss that occurs when light propagating in the core escapes in the Z-axis direction without being totally reflected, in comparison to configurations using tapered cores with a continuously varying length in the height direction (Z-axis direction). Since the core has a substantially uniform thickness (length in the Z-axis direction), ease of handling may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical axis adjustment method for optical interconnection, comprising:
   providing, on a substrate, an optical transmitter including light sources and a mark for acquiring a position of each of the light sources;
   providing, on the substrate, an optical waveguide including cores each allowing light emitted from the respective light sources to propagate through the core;
   determining a first position based on the mark as a position of each of the light sources; and
   forming, at a second position in the optical waveguide corresponding to the first position, first mirrors configured to reflect the light emitted from the respective light sources and make the light propagate through the respective cores.

2. The optical axis adjustment method for optical interconnection according to claim 1, wherein the first mirrors each reflect the light emitted from the respective light sources and entering the optical waveguide in a direction different from a direction of propagation of light in the optical waveguide.

3. The optical axis adjustment method for optical interconnection according to claim 1, wherein the mark is a dummy pattern formed together with a wiring pattern of each of the light sources.

4. The optical axis adjustment method for optical interconnection according to claim 1, wherein a position of each of the light sources is determined based on the first position, and information indicating misalignment between the first position and a position of each of the light sources.

5. The optical axis adjustment method for optical interconnection according to claim 1,
   wherein the substrate has a cavity at a position corresponding to at least one of the light sources, and
   wherein the respective first mirrors are formed by irradiating the optical waveguide with laser light through the cavity.

6. The optical axis adjustment method for optical interconnection according to claim 5, further comprising:
   capturing an image of the mark through the cavity; and
   acquiring a position of the respective light sources as the first position based on image data obtained by capturing the image of the mark.

7. The optical axis adjustment method for optical interconnection according to claim 1,
   wherein an optical receiver is provided on the substrate, the optical receiver including a plurality of light receiving units each configured to receive light propagated through the respective cores, a second mirror is formed in the optical waveguide, the second mirror configured to reflect light propagated through the respective cores and emit the light toward the optical receiver.

8. The optical axis adjustment method for optical interconnection according to claim 7, wherein each of the cores has a slope section in which a width of the core in a direction parallel to a face of the substrate on which the waveguide is provided decreases with increasing proximity to an area in which the second mirror is located.

9. The optical axis adjustment method for optical interconnection according to claim 7, wherein a width of the respective cores on the side of the respective first mirrors is smaller than a width of the respective cores on the side of the second mirror.

10. The optical axis adjustment method for optical interconnection according to claim 8, wherein the slope section has a curved lateral face that is outwardly convex.

* * * * *